(12) United States Patent
Ahn et al.

(10) Patent No.: US 9,811,167 B2
(45) Date of Patent: Nov. 7, 2017

(54) APPARATUS AND METHOD FOR INPUTTING CHARACTER BASED ON HAND GESTURE

(71) Applicant: Korea Electronics Technology Institute, Seongnam-si, Gyeonggi-do (KR)

(72) Inventors: Yang Keun Ahn, Seoul (KR); Kwang Mo Jung, Goyang-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 109 days.

(21) Appl. No.: 14/816,491

(22) Filed: Aug. 3, 2015

(65) Prior Publication Data

US 2016/0246497 A1 Aug. 25, 2016

(30) Foreign Application Priority Data

Feb. 24, 2015 (KR) .......................... 10-2015-0025806

(51) Int. Cl.
*G06F 3/01* (2006.01)
*G06F 3/0489* (2013.01)

(52) U.S. Cl.
CPC .......... *G06F 3/017* (2013.01); *G06F 3/04895* (2013.01)

(58) Field of Classification Search
CPC ... G06F 3/017; G06F 3/04895; G06F 3/04886
See application file for complete search history.

(56) References Cited

U.S. PATENT DOCUMENTS

| 8,745,518 B2 * | 6/2014 | Kornev ............... G06F 3/04886 345/157 |
| 8,799,779 B2 * | 8/2014 | Park ....................... G06F 3/018 345/168 |
| 2010/0333011 A1 * | 12/2010 | Kornev ............... G06F 3/04886 715/773 |
| 2014/0028567 A1 | 1/2014 | Park et al. |

FOREIGN PATENT DOCUMENTS

| JP | 2013-114647 A | 6/2013 |
| KR | 10-2012-0004175 A | 1/2012 |
| KR | 20120004175 A * | 1/2012 |

OTHER PUBLICATIONS

Korean Intellectual Property Office, Communication dated Mar. 21, 2016 issued in corresponding Application No. 10-2015-0025806.

* cited by examiner

*Primary Examiner* — Benjamin C Lee
*Assistant Examiner* — Xuemei Zheng
(74) *Attorney, Agent, or Firm* — Sughrue Mion, PLLC

(57) ABSTRACT

Provided are an apparatus and method for inputting a character based on a hand gesture. The apparatus includes a gesture recognition unit configured to recognize hand gestures of a user corresponding to horizontal directions, vertical directions, and diagonal directions, a control unit configured to control character input according to the directions of the recognized hand gestures, and a display unit configured to display a character pad for the character input and display characters input according to the directions of the hand gestures recognized on the character pad.

4 Claims, 13 Drawing Sheets

APPARATUS AND METHOD FOR INPUTTING CHARACTER BASED ON HAND GESTURE

CROSS-REFERENCE TO RELATED APPLICATION

This application claims priority to and the benefit of Korean Patent Application No. 2015-0025806, filed on Feb. 24, 2015, the disclosure of which is incorporated herein by reference in its entirety.

BACKGROUND

1. Field of the Invention

The present invention relates to character input technology, and more particularly, to an apparatus for recognizing a user's hand gesture of touching a space through a camera and inputting a character according to the recognized hand gesture and a method of inputting a character using the apparatus.

2. Discussion of Related Art

As use of information equipment has become commonplace in present-day society with the development of computer information technology, the importance of natural interaction between information equipment and users is on the rise.

Accordingly, information equipment using a text-oriented interface is being developed to use various movements of a user. A touch screen is a typical device for using movements of a user, and is widely used in smart phones, tablet personal computers (PCs), games, and so on.

According to an implementation principle and an operation method, existing touch screens are classified into various types, such as a resistive (decompression) type, a capacitive type, an infrared type, and an ultrasonic type. Specifically, in the case of the resistive type, a touch input can be made using a finger or an electronic pen, but there are disadvantages of poor screen clarity and vulnerability to impact.

In the case of the capacitive type, an input can be made even by slightly touching the screen. However, it is impossible to make an input with a material that does not induce electrons, and the touch screen is highly likely to malfunction due to minor damage. In addition, the infrared type, the ultrasonic type, etc. have problems of high cost and low durability, and thus show a low degree of utilization.

In addition to these existing problems, a screen positioned on a high place or a screen gradually increasing in size results in an untouchable region of the screen in which information cannot be input because it is not possible to touch the region with a hand. To solve this problem, it is necessary to develop a system that can recognize a hand gesture of a user without a direct touch of a hand of the user or an additional mechanical input device and thus can be remotely controlled.

SUMMARY OF THE INVENTION

The present invention is directed to providing a method of recognizing a hand gesture of a user through a camera and inputting a character according to a total of eight-directional movements corresponding to two horizontal directions, two vertical directions, and four diagonal directions, a character input apparatus including a plurality of buttons disposed in the eight directions from an arbitrary point, and a character input method using the character input apparatus.

According to an aspect of the present invention, there is provided an apparatus for inputting a character based on a hand gesture, the apparatus including: a gesture recognition unit configured to recognize hand gestures of a user corresponding to horizontal directions, vertical directions, and diagonal directions; a control unit configured to control character input according to directions of the recognized hand gestures; and a display unit configured to display a character pad for the character input, and display characters input according to the directions of the hand gestures recognized on the character pad.

The gesture recognition unit may recognize the hand gestures of the user corresponding to one among a total of eight directions including two horizontal directions, two vertical directions, and four diagonal directions.

The control unit may activate character pad interface corresponding to the direction of the hand gestures when a hand gesture of dragging a button of the character pad from a reference position is recognized, and then the control unit may determine character that is inputted based on the last position of hand gesture on the activated character pad interface when a hand gesture of returning to the reference position is recognized.

According to another aspect of the present invention, there is provided a method of inputting a character based on a hand gesture, the method including: recognizing hand gestures of a user corresponding to horizontal directions, vertical directions, and diagonal directions; controlling character input according to directions of the recognized hand gestures; displaying a character pad for the character input; and displaying characters input according to the directions of the hand gestures recognized on the character pad.

The recognizing of the hand gestures may include recognizing the hand gestures of the user corresponding to one among a total of eight directions including two horizontal directions, two vertical directions, and four diagonal directions.

The controlling of the character input may include activating character pad interface corresponding to the direction of the hand gestures when a hand gesture of dragging a button of the character pad from a reference position is recognized; and determining character that is inputted based on the last position of hand gesture on the activated character pad interface when a hand gesture of returning to the reference position is recognized.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Advantages and features of the present invention and a method of achieving the same will be more clearly understood from embodiments described below in detail with reference to the accompanying drawings.

However, the present invention is not limited to the following embodiments and may be implemented in various different forms. The embodiments are provided merely for complete disclosure of the present invention and to fully convey the scope of the invention to those of ordinary skill in the art to which the present invention pertains. The present invention is defined only by the scope of the claims.

Meanwhile, the terminology used herein is for describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated components, steps, operations, and/or elements, but do not preclude the presence or addition of one or more other components, steps, operations, and/or elements.

Hereinafter, exemplary embodiments of the present invention will be described in detail with reference to the accompanying drawings.

Figure 1:
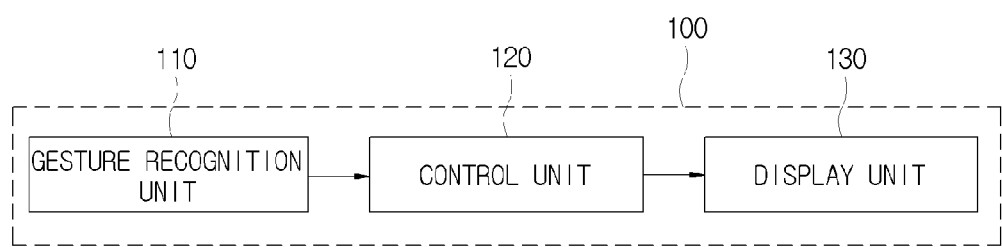
FIG. 1 is a block diagram showing a configuration of an apparatus for inputting a character based on a hand gesture according to an exemplary embodiment of the present invention.
Figure 2A:
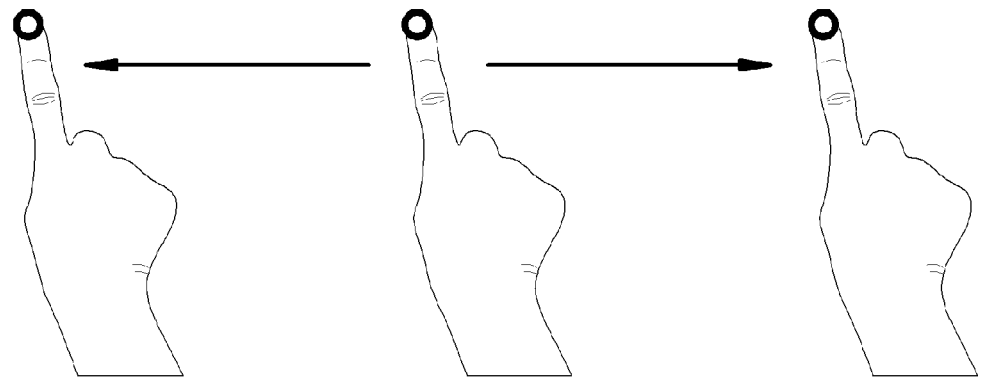
FIGS. 2A to 2C show hand gestures corresponding to a total of eight directions including two horizontal directions, two vertical directions, and four diagonal directions.
Figure 2B:
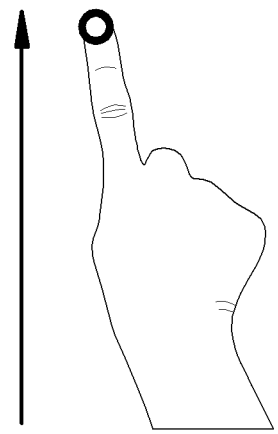
Figure 2B:
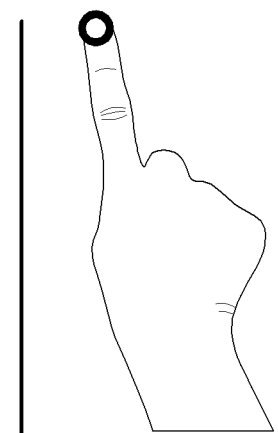
Figure 2B:
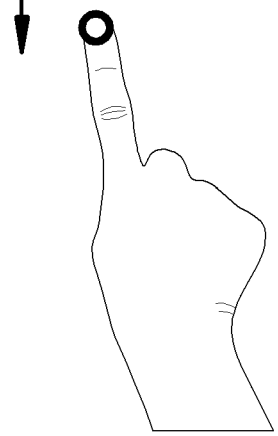
Figure 2C:
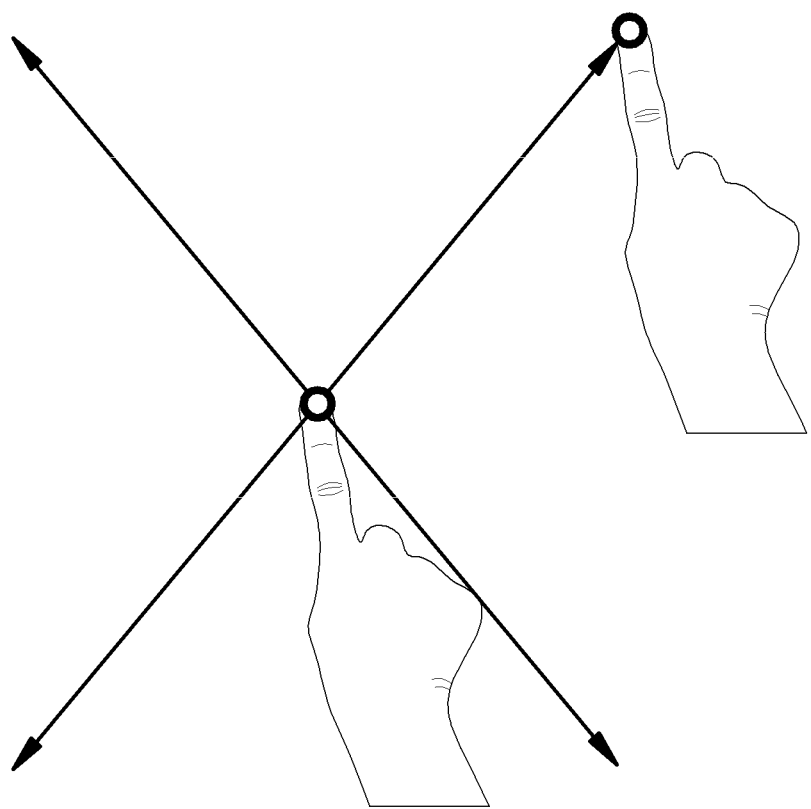

FIG. 1 is a block diagram showing a configuration of an apparatus for inputting a character based on a hand gesture according to an exemplary embodiment of the present invention, and FIGS. 2A to 2C show hand gestures corresponding to a total of eight directions including two horizontal directions, two vertical directions, and four diagonal directions.

As shown in FIG. 1, an apparatus 100 for inputting a character based on a hand gesture according exemplary embodiment of the present invention includes a gesture recognition unit 110, a control unit 120, and a display unit 130.

The gesture recognition unit 110 recognizes hand gestures of a user corresponding to a total of eight directions including two horizontal directions (shown in FIG. 2A), two vertical directions (shown in FIG. 2B), and four diagonal directions (shown in FIG. 2C).

The display unit 130 displays a character pad for character input, and displays characters input according to the directions of the hand gestures recognized on the displayed character pad.

The character pad is an interface screen through which a "Consonant," a "Vowel," an "English (uppercase or lowercase)" letter, a "Special character (SC)," etc. may be input.

The control unit 120 controls interface screen configuration and character input of the character pad according to the directions of the hand gestures recognized by the gesture recognition unit 110.

In particular, the control unit 120 may activate character pad interface corresponding to the direction of the hand gestures when a hand gesture of dragging a button of the character pad from a reference position is recognized, and then the control unit may determine character that is inputted based on the last position of hand gesture on the activated character pad interface when a hand gesture of returning to the reference position is recognized.

With reference to FIG. 3 and FIGS. 4A to 4F, a configuration of the interface screen of the display unit 130 will be described in detail below.

FIG. 3 and FIGS. 4A to 4F are diagrams showing an exemplary embodiment of a display unit shown in FIG. 1.

Figure 3:
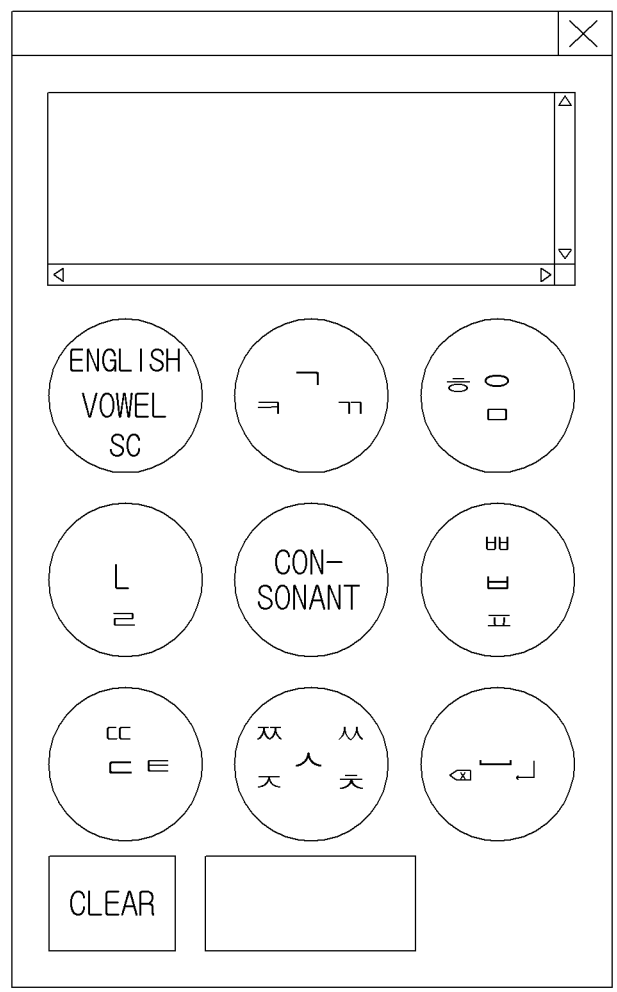
FIG. 3 and FIGS. 4A to 4F are diagrams showing an exemplary embodiment of a display unit shown in FIG. 1.

As shown in FIG. 3, the character pad displayed by the display unit 130 is configured in a form in which eight buttons are disposed at positions corresponding to eight directions, that is, two horizontal directions (←, →), two vertical directions (↑, ↓), and four diagonal directions (↖, ↗, ↘, ↙), spaced apart from a starting point. It is possible to change from a current interface screen to another interface screen using an arbitrary button provided in the character pad.

Here, the starting point displays the type of characters that may be input through a currently activated interface, and, for example, "Consonant," "Vowel," "English (uppercase or lowercase)," "SC," etc. may be displayed at the starting point of the character pad.

In each of the eight buttons disposed around the starting point, characters that may be currently input are grouped and displayed according to the type of characters of which input is activated.

For example, in the case of a consonant input screen, a total of 19 initial consonants "ㄱ," "ㄲ," "ㄴ," "ㄷ," "ㄸ," "ㄹ," "ㅁ," "ㅂ," "ㅃ," "ㅅ," "ㅆ," "ㅇ," "ㅈ," "ㅉ," "ㅊ," "ㅋ," "ㅌ," "ㅍ," and "ㅎ" are classified into six groups "ㅋ, ㄱ, ㄲ," "ㅎ, ㅇ, ㅁ," "ㅃ, ㅂ, ㅍ," "ㅉ, ㅈ, ㅅ, ㅆ, ㅊ," "ㄸ, ㄷ, ㅌ," and "ㄴ, ㄹ" for convenience, functions corresponding to "Word spacing," "Delete," and "Next line" are classified into one group, and functions for entering "Vowel," "English letter," and "SC" input stages are classified into one group, so that the total of eight groups may be set in the eight buttons.

Here, characters included in one button may be disposed in a shape that changes according to the position of the button. For example, when a button positioned on the upper right side (↗) is clicked or a hand gesture corresponding to the diagonal direction (↗) is recognized, enlarged characters of the button positioned in the diagonal direction (↗) may be gathered on the upper right side (↗).

Subsequently, when any one of the eight buttons is selected by a hand gesture of the user, a character group displayed in the button is enlarged, so that one character or function is disposed separately in one button, respectively.

Specifically, respective button configurations according to interface screens for inputting a "Consonant," a "Vowel," an "English uppercase (EU) letter," an "English lowercase (EL) letter," and a "SC" are shown in FIGS. 4A to 4F in detail.

As shown in FIGS. 4A to 4F, a button for changing to another character input interface may be disposed on an upper left side (↖) in each initial interface screen.

For example, when a currently activated interface is an interface for inputting a "Consonant," buttons for changing to any one interface among "Vowel," "English," and "SC" interfaces may be disposed on the upper left side (↖).

Also, a button for performing "Word spacing," "Delete," and "Next line" may be disposed on a lower right side (↘) in each interface screen.

In six buttons excluding the aforementioned buttons on the upper left side (↖) and on the lower right side (↘), a total of 19 consonants, a total of 21 vowels, a total of 26

English letters, a total of 10 digits, and a total of 32 special characters may each be classified into six groups and disposed for convenience.

As described above, the total of nine buttons including the starting point button may be disposed in a square form, that is, three buttons each in three horizontal directions and three buttons each in three vertical directions, but exemplary embodiments of the present invention are not limited to this case.

Figure 5A:
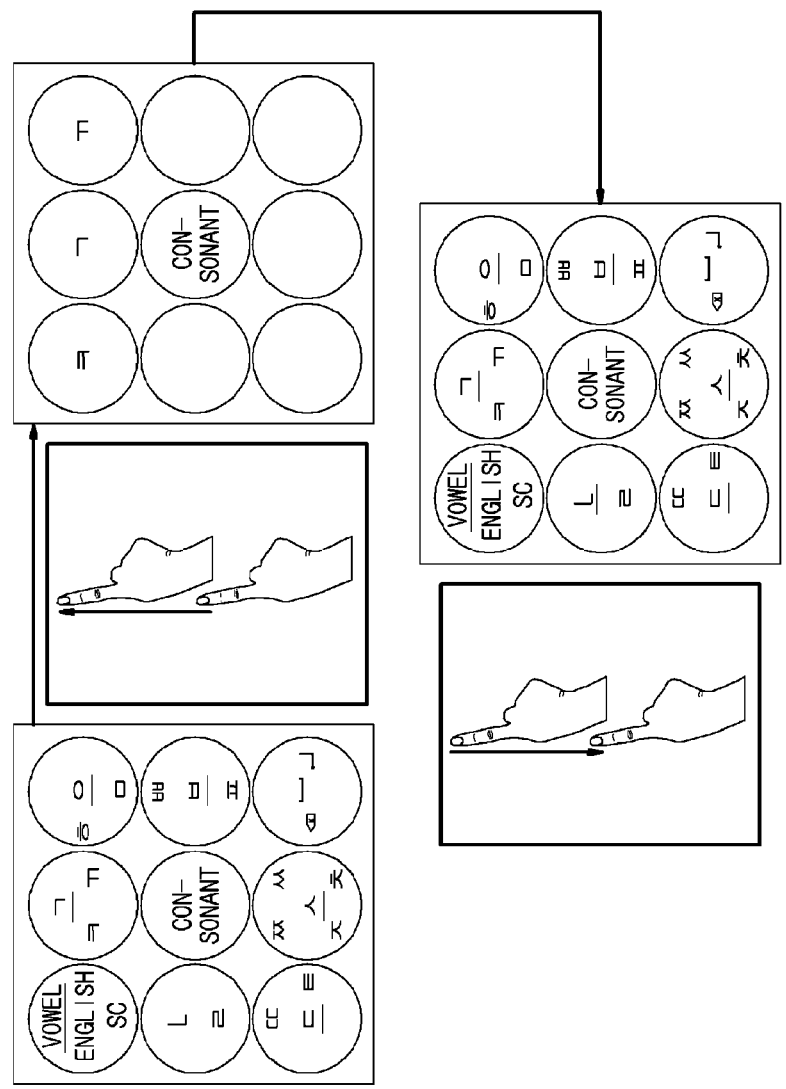
FIGS. 5A and 5B are diagrams showing a process of inputting "가" according to an exemplary embodiment of the present invention.
Figure 5B:
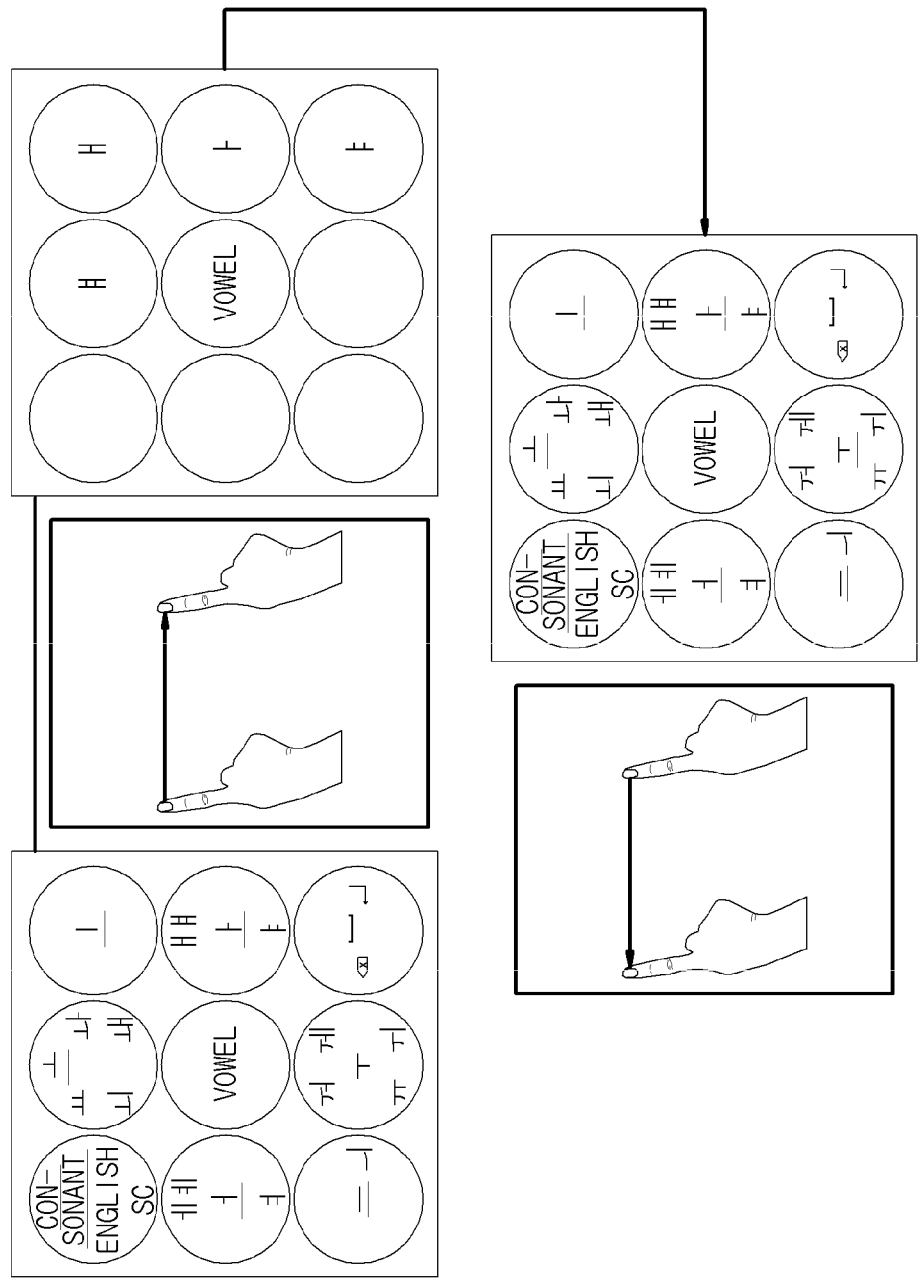

With reference to FIGS. 5A and 5B, a detailed method of inputting a character will be described in detail below.

FIGS. 5A and 5B are diagrams showing a process of inputting "가" according to an exemplary embodiment of the present invention.

For example, input of the character "가" is made in order "ㄱ" and "ㅏ." First, to input "ㄱ," the user activates an interface for inputting a "Consonant" as shown in FIG. 5A.

When the interface for inputting a "Consonant" is activated, the user moves his or her hand vertically upward (↑) to input "ㄱ," and then moves his or her hand back to a center point through the "ㅋ, ㄱ, ㄲ" button. At this time, by setting buttons to be changed in color when a hand of a user passes through the buttons, the user may confirm the button selected by his or her hand.

When the "ㅋ, ㄱ, ㄲ" button is selected by the hand gesture of the user, "ㅋ, ㄱ, ㄲ" that have been grouped and displayed in one button are separated into "ㅋ," "ㄱ," and "ㄲ," and each of "ㅋ," "ㄱ," and "ㄲ" is separately displayed in one button, respectively. When the user moves his or her hand vertically upward (↑) again and then moves his or her hand back to the center point through the "가" button, "가" is input, and simultaneously, the process returns to the initial interface stage for inputting a "Consonant."

Subsequently, when the user moves his or her hand left upward (↖) to activate an interface for inputting a "Vowel" and then moves his or her hand back to the center point through the "Consonant, English, SC" button, "Consonant, English, SC" are separated into "Consonant," "English," and "SC," and each of "Consonant," "English," and "SC" is separately displayed in one button, respectively. When the user moves his or her hand left upward (↖) again and then moves his or her hand back to the center point through the "Vowel" button, the interface for inputting a "Vowel" is activated.

As shown in FIG. 5B, when the interface for inputting a "Vowel" is activated, the user moves his or her hand rightward (→) to input "ㅏ," and then moves his or her hand back to the center point through the "ㅐ, ㅒ, ㅏ, ㅑ" button.

When the "ㅐ, ㅒ, ㅏ, ㅑ" button is selected by the hand gesture of the user, the "ㅐ, ㅒ, ㅏ, ㅑ" button that have been grouped and displayed in one button are separated into "ㅐ," "ㅒ," "ㅏ," and "ㅑ," and each of "ㅐ," "ㅒ," "ㅏ," and "ㅑ" is separately displayed in one button, respectively. When the user moves his or her hand rightward (→) again and then moves his or her hand back to the center point through the "ㅏ" button, "가" is finally input, and simultaneously, the process returns to the initial interface stage for inputting a "Vowel."

In other words, the user activates an interface including corresponding character by moving his or her hand horizontally, vertically, or diagonally according to the position of a button including a letter to be input among eight buttons displayed in an initial interface screen, and as described above, finally inputs the letter by moving his or her hand to a button showing the letter to be input when letters included in the button are enlarged and separately displayed in respective buttons.

Figure 4A:
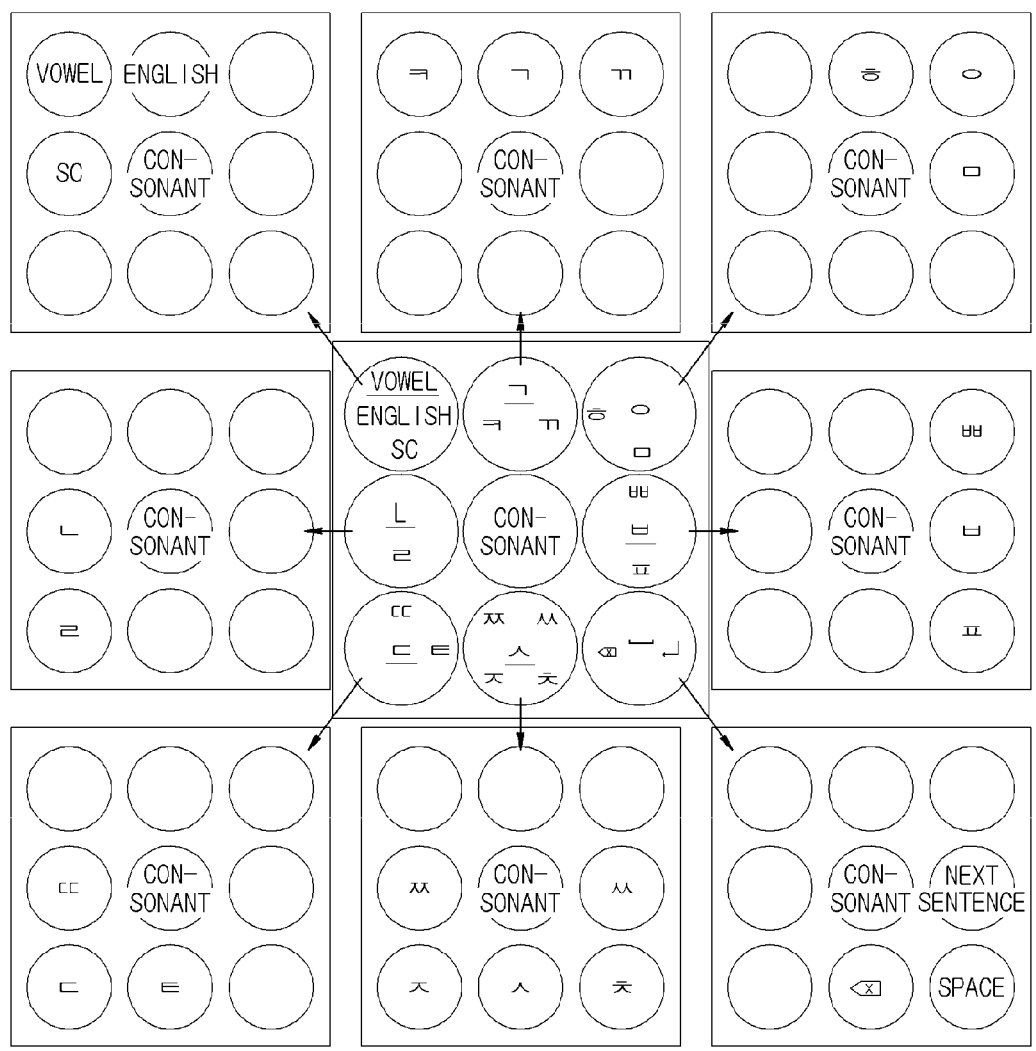
Figure 4B:
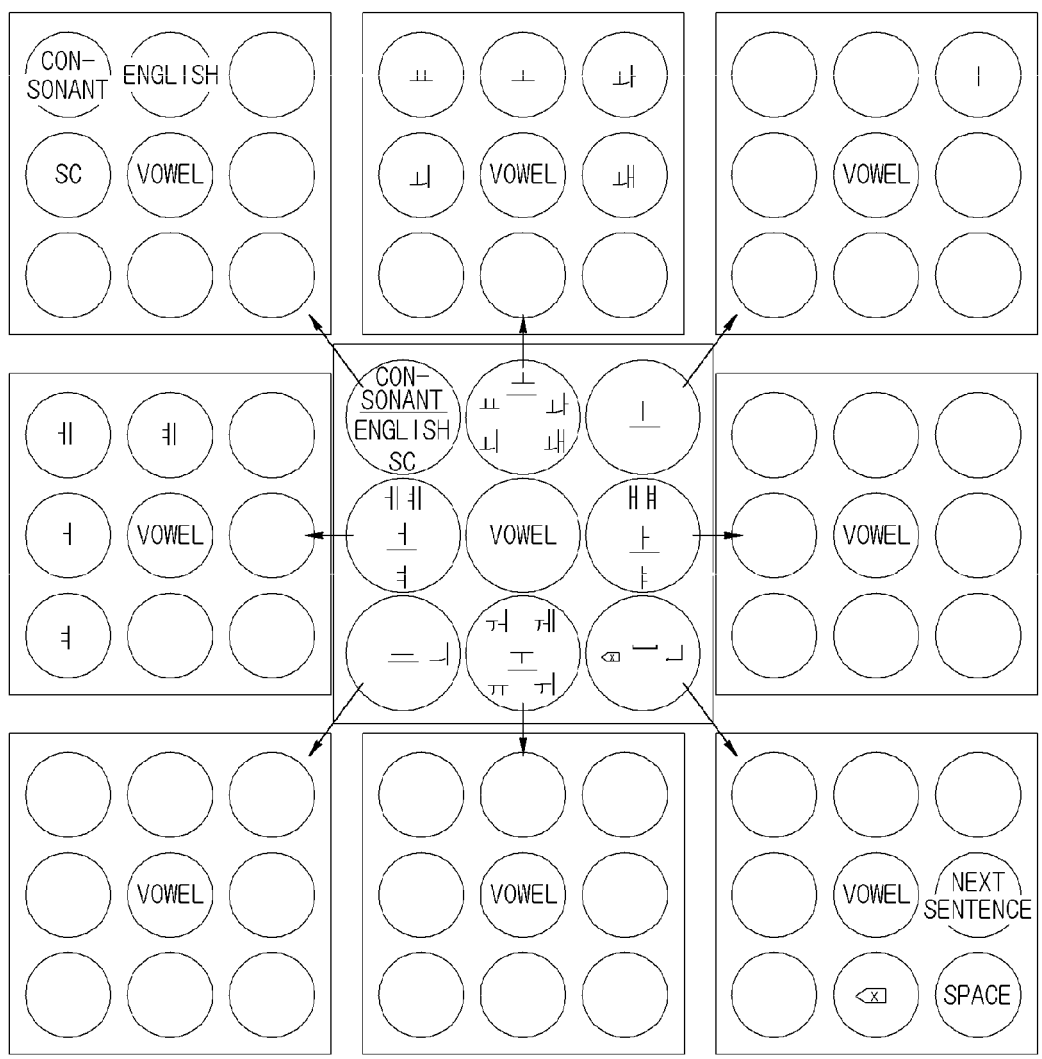
Figure 4C:
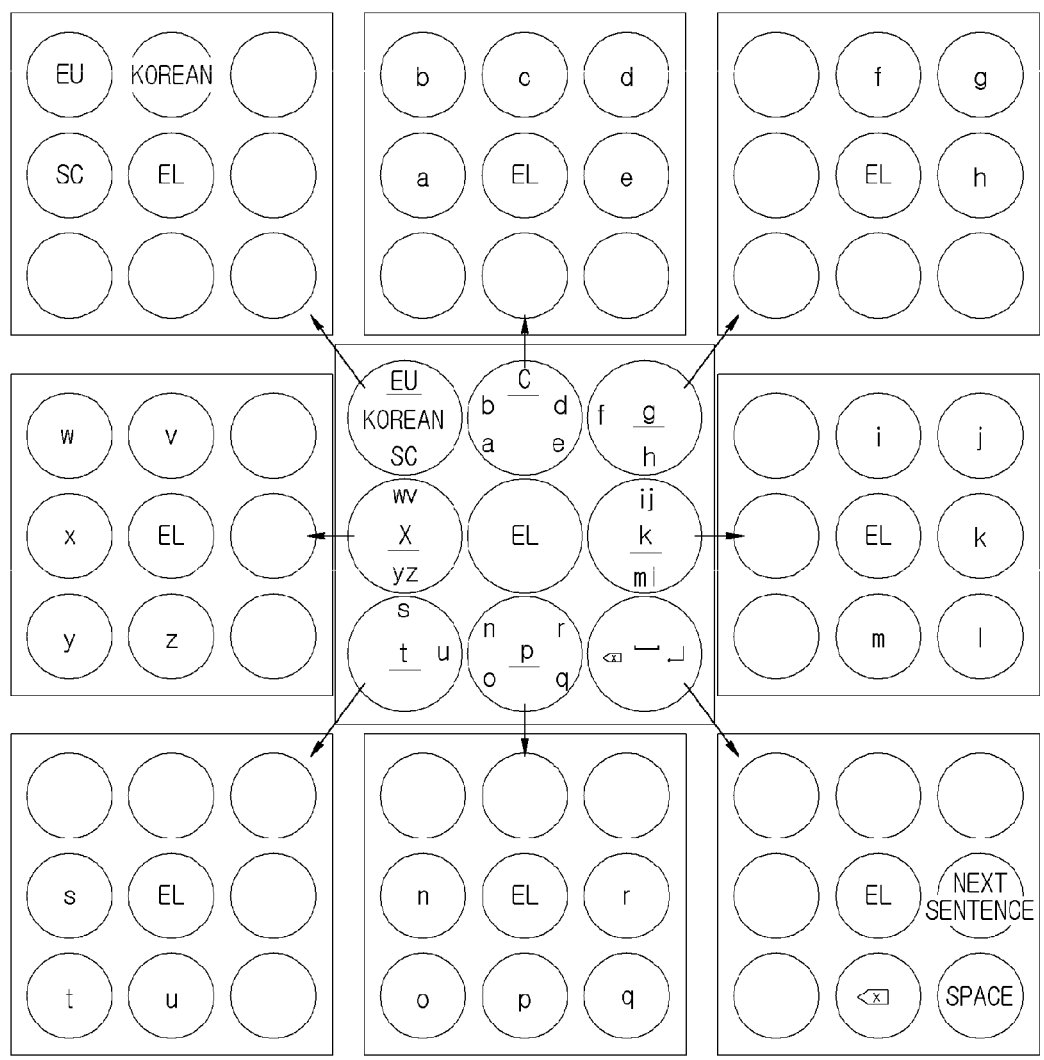
Figure 4D:
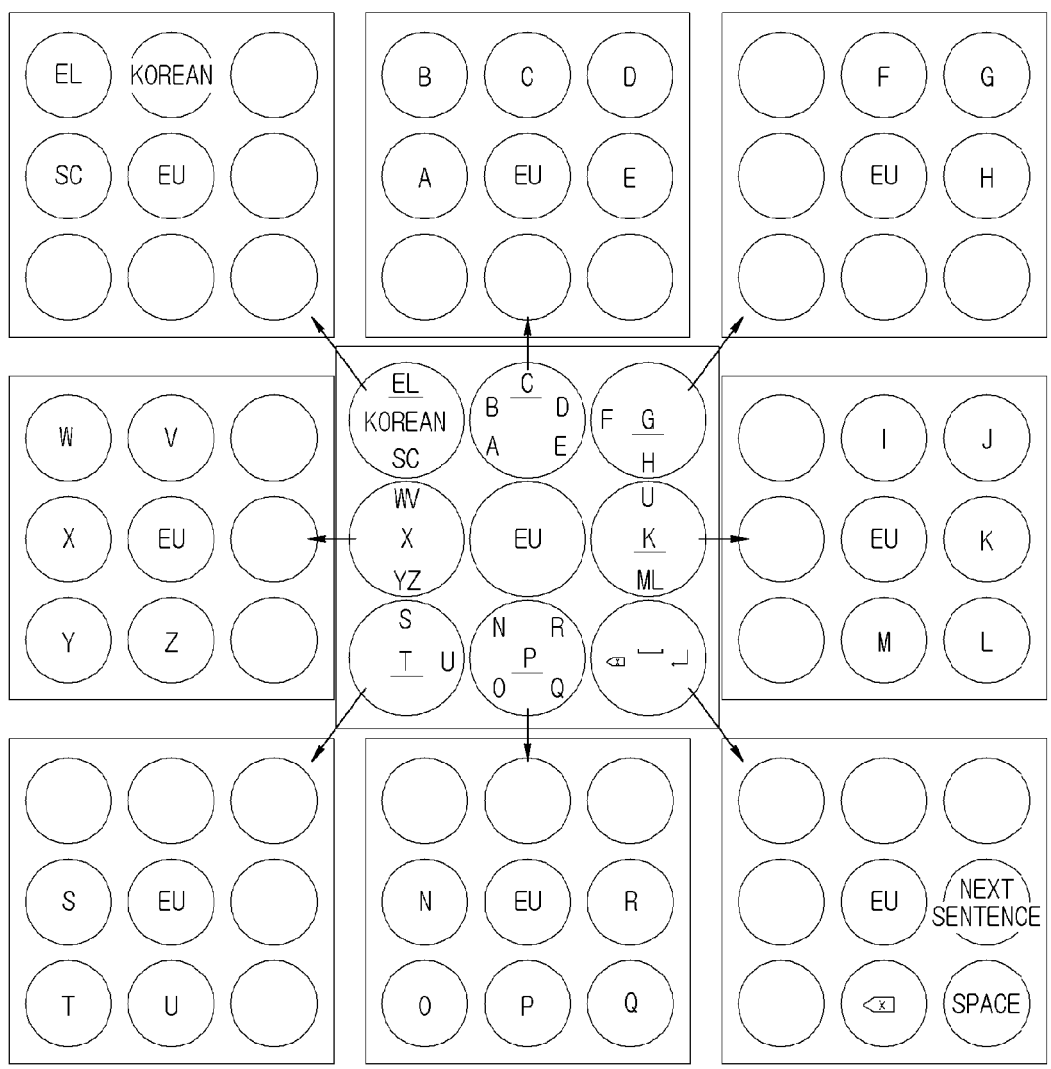
Figure 4E:
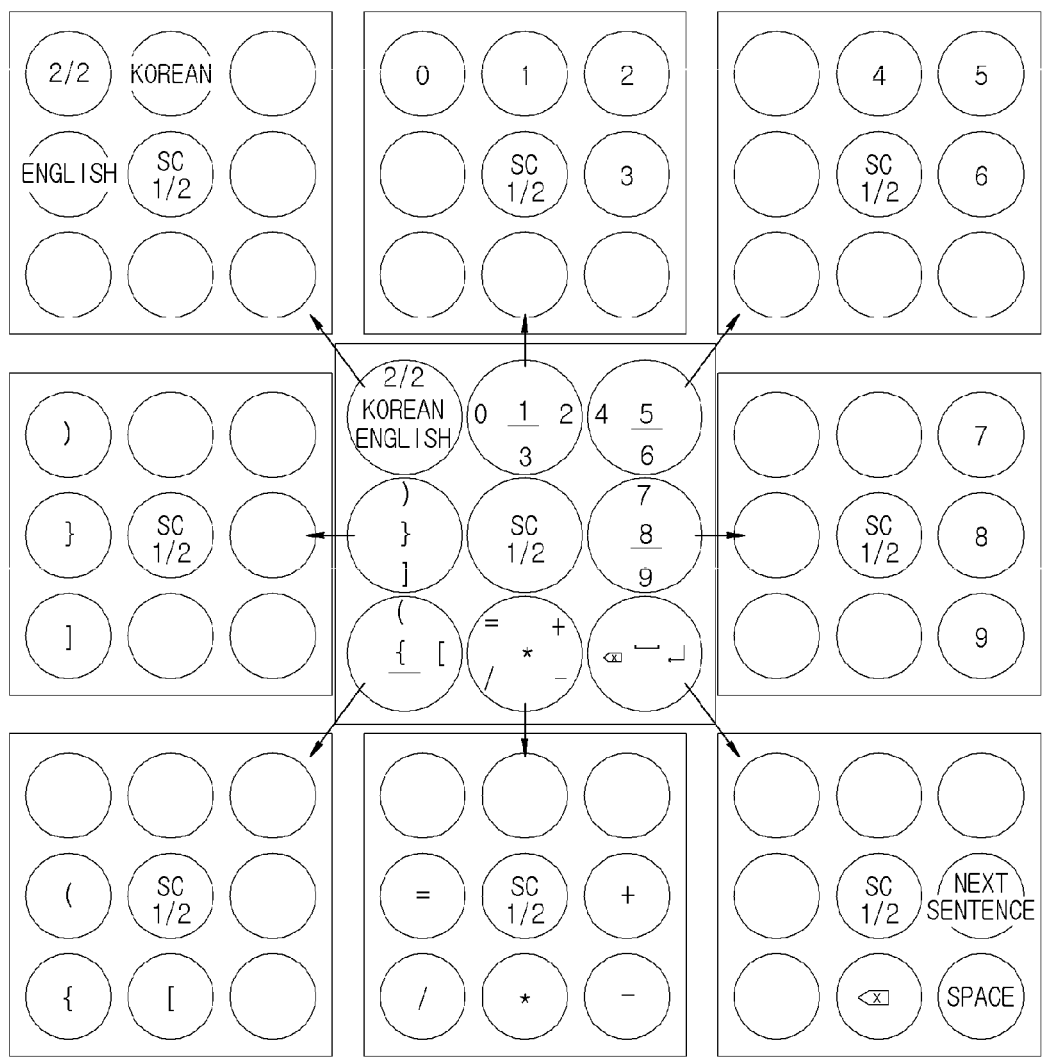
Figure 4F:
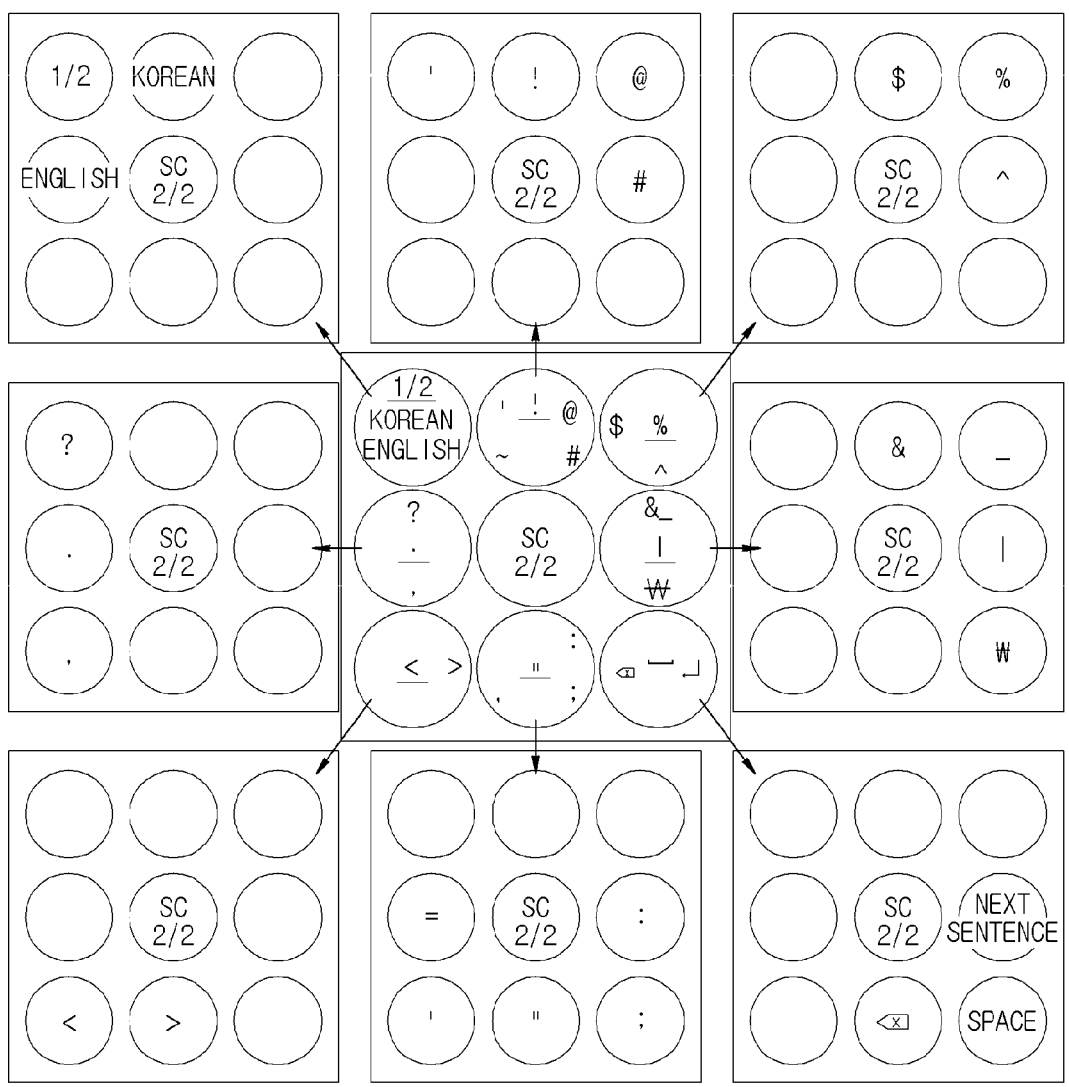

Meanwhile, the process of inputting an English letter has not been shown in the drawings, but the process of inputting an English letter (uppercase or lowercase) is the same as the process of inputting a Korean letter. With reference to FIG. 4C, the process of inputting the English lowercase letters "ok" will be described below.

As shown in FIG. 4C, in an English lowercase input interface, the total of 26 English lowercase letters "a," "b," "c," "d," "e," "f," "g," "h," "i," "j," "k," "l," "m," "n," "o," "p," "q," "r," "s," "t," "u," "v," "w," "x," "y," and "z" are classified into six groups "a, b, c, d, e," "f, g, h," "i, j, k, l, m," "n, o, p, q, r," "s, t, u," and "v, w, x, y, z" for convenience, the functions corresponding to "Word spacing," "Delete," and "Next line" are classified into one group, and functions for entering "English uppercase," "Korean," and "SC" input stages are classified into one group, so that the total of eight groups may be set in the eight buttons (see the box of the second row and the second column in FIG. 4C).

Here, characters included in one button may be disposed in a shape that changes according to the position of the button. For example, characters disposed when a button positioned on the upper right side (↗) is enlarged may be gathered on the upper right side (↗).

Subsequently, when any one of the eight buttons is selected by a hand gesture of the user, a character group displayed in the button is enlarged, so that one character or function is disposed separately in one button, respectively.

For example, when it is recognized that a hand of the user has been moved upward (↑), the button positioned on the upper (↑) side is activated, and "a, b, c, d, e" that have been grouped and displayed in one button are separated into "a," "b," "c," "d," and "e," so that each of "a," "b," "c," "d," and "e" is separately displayed in one button, respectively (see the box of the first row and the second column in FIG. 4C).

In this context, in the process of inputting the English lowercase letters "ok," input of the letters "ok" is made in order of "o" and "k." First, to input "o," the user activates an interface for inputting an "English lowercase."

When the interface for inputting an "English lowercase" is activated, the user moves his or her hand vertically downward (↓) to input "o." When the vertically downward (↓) hand gesture of the user is recognized, the "n, o, p, q, r" button is activated, and "n, o, p, q, r" that have been grouped and display in one button are separated into "n," "o," "p," "q," and "r," so that each of "n," "o," "p," "q," and "r" is separately displayed in one button, respectively (see the box of the third row and the second column in FIG. 4C). When the user moves his or her hand left downward (↙) to pass through the "o" button and then moves his or her hand right upward (↗) to move the hand back to the center point, "o" which is at the final position of the hand before the hand is moved back to the center point is input, and simultaneously, the process returns to the initial interface stage for inputting an "English lowercase."

Subsequently, when the user moves his or her hand rightward (→) to input "k," the rightward (→) hand gesture of the user is recognized, and the "i, j, k, l, m" button is activated. As a result, "i, j, k, l, m" that have been grouped and displayed in one button are separated into "i," "j," "k," "l" and "m," and each of "i," "j," "k," "l" and "m" is separately displayed in one button, respectively. These buttons are shown in the box of the second row and the third column in FIG. 4C by way of example. In this state, the final position of the hand of the user is the button "k," and thus, the user moves his or her hand leftward (←) to move the hand back to the center point. As a result, "k" is input, and simultaneously, the process returns to the initial interface stage for inputting an "English lowercase."

Figure 6:
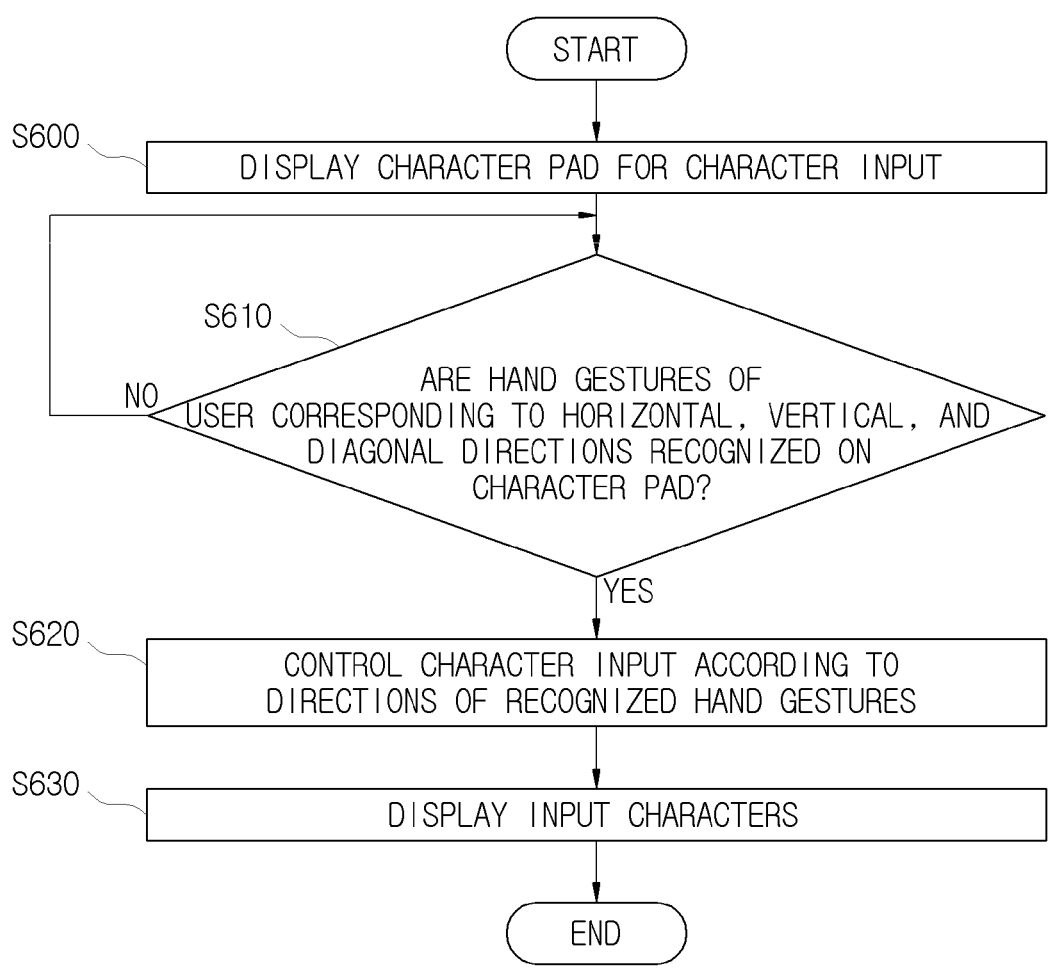
FIG. 6 is a flowchart illustrating a method of inputting a character based on a hand gesture according to an exemplary embodiment of the present invention.

FIG. 6 is a flowchart illustrating a method of inputting a character based on a hand gesture according to an exemplary embodiment of the present invention.

As shown in FIG. 6, in a method of inputting a character based on a hand gesture according to an exemplary embodiment of the present invention, a character pad for character input is displayed (S600), and it is determined whether hand gestures of a user corresponding to horizontal, vertical and diagonal directions are recognized on the displayed character pad (S610).

When hand gestures corresponding to the aforementioned directions are recognized on the displayed character pad, character input is controlled according to the directions of the recognized hand gestures (S620), and input characters are displayed (S630).

A detailed method for each process of inputting a character based on the direction of a hand gesture has been described above and will not be reiterated.

According to an exemplary embodiment of the present invention, by recognizing hand gestures corresponding to a total of eight directions including two horizontal directions, two vertical directions, and four diagonal directions and inputting characters according to the recognized hand gesture, it is possible to remotely input the characters without a direct touch of a user's hand or an additional mechanical input device.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus for inputting a character based on a hand gesture, the apparatus comprising:
   at least one processor to implement:
   recognizing hand gestures of a user corresponding to horizontal directions, vertical directions, and diagonal directions; and
   controlling a character input according to directions of the recognized hand gestures; and
   a display configured to display a character pad for the character input, and display characters input according to the directions of the hand gestures recognized on the character pad,
   wherein the character pad comprises a character pad interface in which a starting point of the character input indicating a type of characteristics that is enabled to be input through a currently activated interface is positioned in a central area of the character pad interface, and
   wherein the at least one processor activates the character pad interface corresponding to the direction of the hand gestures when a hand gesture of dragging a button of the character pad from the starting point is recognized, the character pad interface comprising a plurality of buttons spaced apart from the starting point located in the central area of the character pad interface, and determines a character that is input based on a final position of a last hand gesture on the activated character pad interface when a hand gesture of returning to the starting point is recognized.

2. The apparatus of claim 1, wherein the gesture recognizer recognizes the hand gesture of the user corresponding to one among a total of eight directions including two horizontal directions, two vertical directions, and four diagonal directions.

3. A method of inputting a character based on a hand gesture, the method comprising:
   recognizing hand gestures of a user corresponding to horizontal directions, vertical directions, and diagonal directions;
   controlling a character input according to directions of the recognized hand gestures;
   displaying a character pad for the character input; and
   displaying characters input according to the directions of the hand gestures recognized on the character pad,
   wherein the character pad comprises a character pad interface in which a starting point of the character input indicating a type of characteristics that is enable to be input through a currently activated interface is positioned in a central area of the character pad interface,
   wherein the controlling of the character input comprises activating character pad interface corresponding to the direction of the hand gestures when a hand gesture of dragging a button of the character pad from the starting point is recognized, the character pad interface comprising a plurality of buttons spaced apart from the starting point located in the central area of the character pad interface, and determining a character that is input based on a final position of a last hand gesture on the activated character pad interface when a hand gesture of returning to the starting point is recognized.

4. The method of claim 3, wherein the recognizing of the hand gestures comprises recognizing the hand gestures of the user corresponding to one among a total of eight directions including two horizontal directions, two vertical directions, and four diagonal directions.

* * * * *